United States Patent [19]
Joulin et al.

[11] Patent Number: 5,895,572
[45] Date of Patent: Apr. 20, 1999

[54] POROUS MONOLITHIC SUPPORT FOR FILTRATION MEMBRANES

[75] Inventors: Jean-Pierre Joulin, Paris; Valerie Thoraval, Morance, both of France

[73] Assignee: Techsep, Courbevoie Cedex, France

[21] Appl. No.: 08/530,934

[22] Filed: Sep. 19, 1995

[30] Foreign Application Priority Data

Sep. 28, 1994 [FR] France .................. 94 11568

[51] Int. Cl.$^6$ ................................. B01D 63/06
[52] U.S. Cl. ................. 210/321.78; 210/321.87; 210/323.1; 210/323.2; 210/433.1; 210/510.1; 96/4; 96/9
[58] Field of Search ................. 210/496, 510.1, 210/506, 500.26, 321.78, 321.87, 323.1, 323.2, 433.1; 55/523; 96/4, 9

[56] References Cited

U.S. PATENT DOCUMENTS

| | | | |
|---|---|---|---|
| 3,737,043 | 6/1973 | Clark | 210/496 X |
| 4,894,160 | 1/1990 | Abe et al. | 210/510.1 |
| 5,104,546 | 4/1992 | Filson et al. | 210/650 |
| 5,454,947 | 10/1995 | Olapinski et al. | 210/510.1 |
| 5,607,586 | 3/1997 | Grangeon et al. | 210/323.2 |

FOREIGN PATENT DOCUMENTS

93/07959  4/1993  WIPO .................. B01D 71/02

OTHER PUBLICATIONS

Journal of Membrane Science, vol. 39, 1988, Amsterdam, NL pp. 221–241 Hsieh and al. "Microporous Alumina Membranes" Abstract; figures 5, 6A, 6B, p. 227, paragraph 1.

*Primary Examiner*—W. L. Walker
*Attorney, Agent, or Firm*—Andrew M. Solomon

[57] ABSTRACT

The present invention relates to a porous monolithic support (1) for filtration membranes containing channels (2, 3, 4), the internal surface of which supports the membranes (14, 15, 16), characterized in that the said support contains at least two channels, all of said channels having:

(a) substantially similar sections,
(b) interchannel partitions (5, 6, 7) and partitions with the outside of the support (8, 9, 10) of substantially constant thickness and
(c) a partition with the outside of the support of substantially the same surface area.

Application to the tangential filtration of viscous fluids and/or of fluids containing solid materials.

12 Claims, 2 Drawing Sheets

POROUS MONOLITHIC SUPPORT FOR FILTRATION MEMBRANES

The present invention relates to a porous monolithic support, in particular of ceramic material, for filtration membranes.

These membranes have been known for a long time for their separating properties and are rapidly expanding in many sectors of activity, such as agribusiness, biotechnologies, treatment of drinking and industrial water, the pharmaceutical industry and the nuclear industry.

Monoliths pierced with channels on which the membranes are deposited, such as, for example, those described in U.S. Pat. No. 4,069,157, EP-A-470,340 and EP-A-585,152, have the twofold advantage of having a large exchange surface area of the membrane per unit of volume and a very good permeability factor. The permeability factor is, for example, defined by U.S. Pat. No. 4,069,157.

In addition, these supports and membranes, in particular when they are made of inorganic and/or ceramic material, due to their mechanical strength and their chemical, biological and thermal inertia, have a very long lifetime of use and can operate under extreme conditions of use (pH, temperature, pressure, radiation, and the like).

However, in certain cases, problems of use are posed by these supports.

As the channels are situated in different regions of the support, they do not operate in the same way and it is observed that certain channels are subject to preferential blinding.

Moreover, it proves difficult to filter very viscous and/or heterogeneous fluids which contain solid fibrous materials of textile or papermaking origin.

In fact, in the case of known multichannel monoliths generally having more than 7 channels of square or circular section, as described in U.S. Pat. No. 4,069,157 and EP-A-470,340, a fibre can be found in several channels at the same time, at the inlet of the monolith, and repetition of the phenomenon can lead to obstruction of the monolith.

Monoliths containing many small channels are therefore not suitable for the filtration of fluids of this type.

The present invention, in order in particular to solve the above problem, provides a technical solution which makes it possible, on the one hand, to increase the diameter of the channels and, on the other hand, to reduce the number of channels, while retaining the largest possible filtering surface area and appropriate mechanical properties.

The present invention relates, in fact, to a porous monolithic support for filtration membranes containing channels, the internal surface of which supports the membranes, characterized in that the said support contains at least two channels, each channel having:

(a) substantially similar sections,
(b) interchannel partitions and partitions with the outside of the support of substantially constant thickness and
(c) a partition with the outside of the support of substantially the same surface area.

It is recommended that the number of channels be between 2 and 8 inclusive, and preferably between 3 and 4 inclusive.

Moreover, the sharp angles of the sections of the channels are rounded in order to decrease the pressure drop and the blinding.

The support has a cross-section having a central axis of symmetry. This cross-section can advantageously be circular or hexagonal.

In the monolith according to the invention, all the channels are identically arranged within the monolith. Under these conditions, all the channels operate similarly during filtration, that is to say that all the channels filter and are blinded substantially identically and there is no preferential blinding.

In addition, the support according to the invention, while retaining the advantage of the monoliths with respect to the single pipe, makes it possible to obtain a greater expanded surface area of the membranes for a given bulk, while retaining a large section of the channels for the passage of the fluid to be filtered.

While the monolith according to the invention is preferably made of ceramic material, as, for example, according to the teaching of U.S. Pat. No. 4,069,157, EP-A-470,340 and EP-A-585,152 mentioned above, it can also be made of metal, of carbon and, generally, of any inorganic material.

In the case of the use of ceramic material, an external diameter advantageously of between 6 and 40 mm and a length of between 10 cm and 2 m are recommended according to the invention, in the case of the use of a support of cylindrical section. The thickness of the interchannel partitions and of the partition of each channel with the external surface of the support is generally between 0.5 and 3 mm.

The supports according to the invention can be prepared by conventional extrusion processes of a ceramic paste through a die of suitable shape. It is recommended in this case to follow the teaching of EP-A-585,152 mentioned above.

Preferably, the dies used have a shape suitable for the angles with respect to the channels to be rounded.

The support is then sintered. This support generally has a pore diameter of between 2 and 10 μm. An inorganic and/or organic membrane for microfiltration (pore diameter of between 0.1 and 1.5 μm) or for ultrafiltration (pore diameter of between 2 nm and 0.1 μm) is deposited on this support within the channels and optionally at the external surface of the support. These membranes are prepared by depositing at least one layer of inorganic particles and/or of polymer by using, for example, the starting materials and the method described in the abovementioned Patent Application EP-A-585,152.

The monoliths according to the invention are more particularly advantageous for filtering suspensions which are heavily laden with solid materials and/or which are very viscous, such as, for example, certain fermentation musts, papermaking effluents, suspensions of fibrous products and petroleum products.

Other advantages and characteristics of the invention will become apparent on reading the following implementational example given by way of illustration, without implied limitation. Reference will be made to the appended drawing in which.

Figure 1:
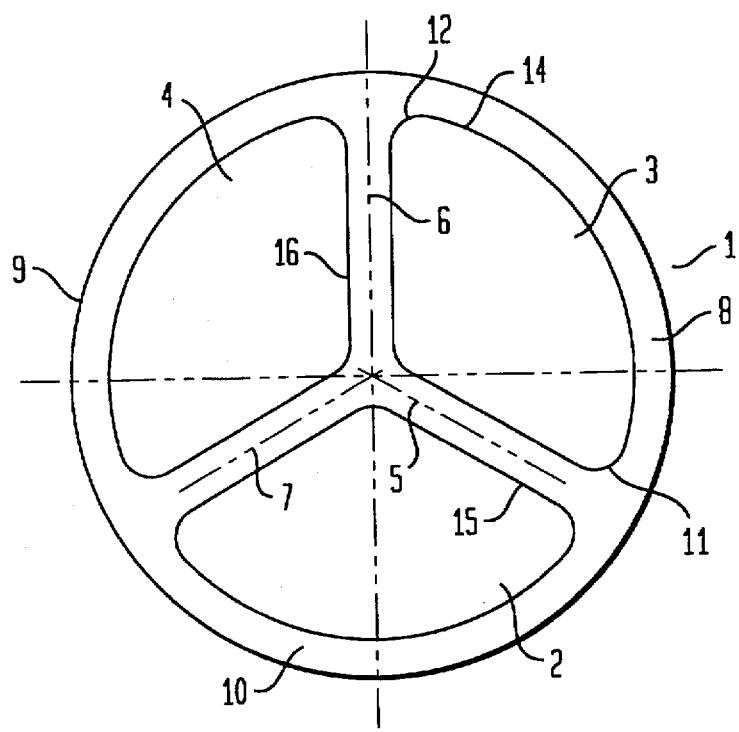
FIG. 1 is a cross-section of a cylindrical support containing 3 channels.

FIG. 1 shows a monolithic support 1 made of ceramic containing 3 substantially identical channels 2, 3 and 4.

It is seen that each channel has sections of similar shape and interchannel partitions 5, 6 and 7 of substantially constant thickness, each channel additionally having a partition 8, 9 and 10 with the outside of the support of the same thickness and of the same surface area.

It is additionally seen that the sharp angles 11, 12 and 13 are rounded for the purpose of improving movement of the fluid to be filtered and of facilitating deposition of the membrane 14, 15 and 16 deposited at the internal surface of each channel 2, 3 and 4 respectively.

Figure 2:
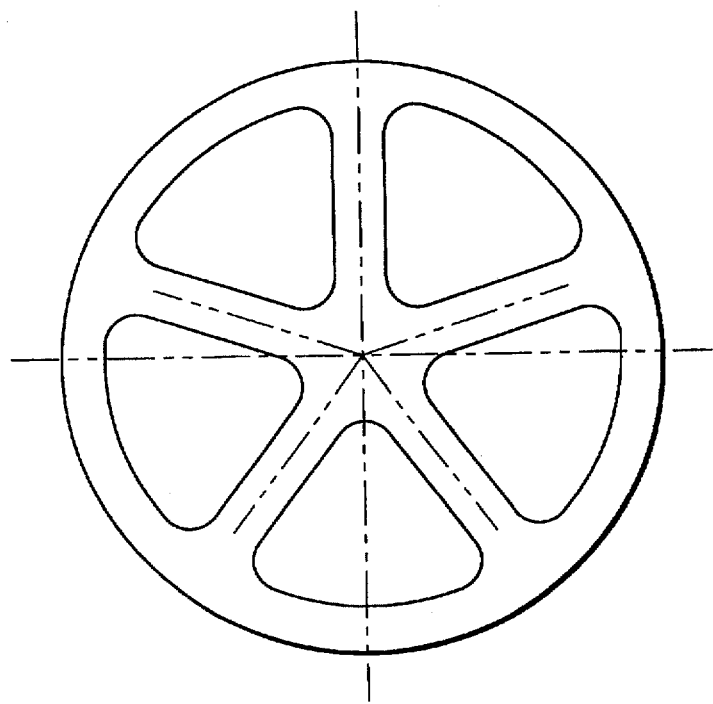
FIG. 2 is a cross-section of a cylindrical support containing 5 channels.

In FIG. 2, it is seen that a support of circular section contains 5 identical channels.

Figure 3:
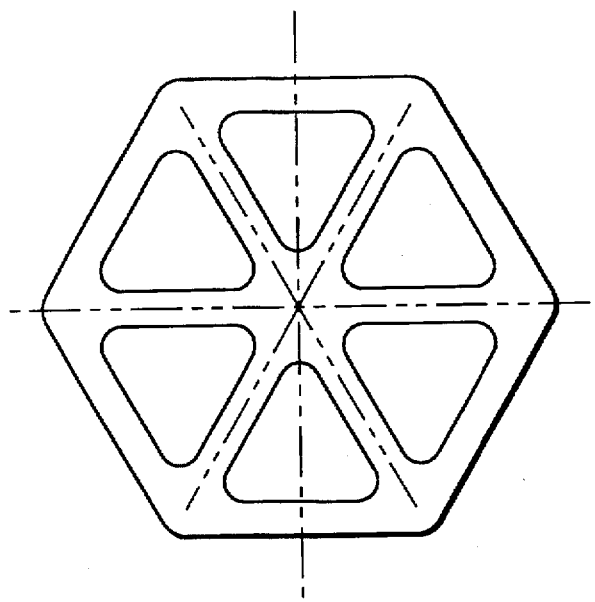
FIG. 3 is a cross-section of a support of hexagonal section containing 6 channels.
Figure 4:
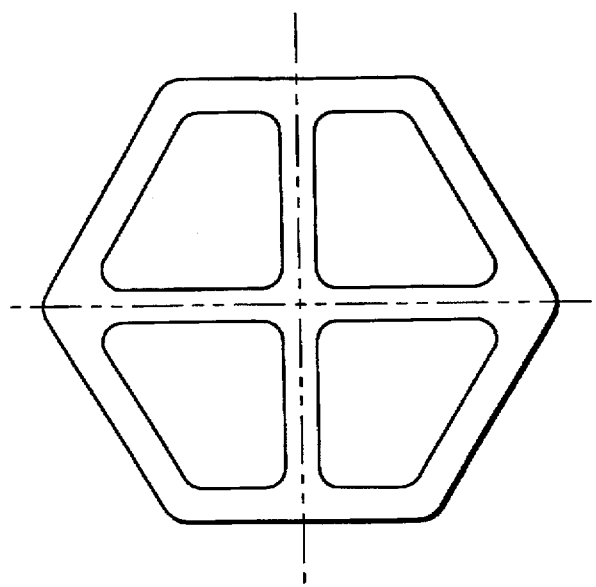
FIG. 4 is a cross-section of a support of hexagonal section containing 4 channels.

In FIGS. 3 and 4, it is seen that a support of hexagonal section contains 6 and 4 identical channels respectively.

We claim:

1. Porous monolithic support for filtration membranes containing channels, the internal surface of which supports the membranes, wherein said support has a central axis of symmetry and contains at least two channels identically arranged within said support all of said channels having:
   (a) substantially similar sections, and
   (b) interchannel partitions and partitions with the outside of the support of substantially constant thickness.

2. Support according to claim 1, characterized in that the number of channels is between 2 and 8 inclusive.

3. Support according to claim 1, characterized in that the sharp angles of the sections of the channels are rounded.

4. Support according to claim 1, characterized in that the support has a section selected from the group consisting of a circular section and a hexagonal section.

5. The support according to claim 2, characterized in that the number of channels is between 3 and 4 inclusive.

6. The support according to claim 2 characterized in that the sharp angles of the sections of the channel are rounded.

7. The support according to claim 2 characterized in that the support has a section selected from the group consisting of a circular section and a hexagonal section.

8. The support according to claim 3 characterized in that the support has a section selected from the group consisting of a circular section and a hexagonal section.

9. The support according to claim 8, wherein the section is circular, the said support being a ceramic material.

10. The support according to claim 9, wherein the said support has an external diameter of between 6 and 40 mm.

11. The support according to claim 10, wherein the said support has a length of between 10 cm and 2 m.

12. The support according to claim 9, wherein the thickness of the interchannel partitions and partitions with the outside of the support is between 0.5 and 3 mm.

* * * * *